US 6,744,381 B1

(12) United States Patent
Collins

(10) Patent No.: US 6,744,381 B1
(45) Date of Patent: Jun. 1, 2004

(54) AIRCRAFT EMERGENCY WARNING SYSTEM

(76) Inventor: Michael J. Collins, 80 Pierce St., Lehigh Acres, FL (US) 33972

( * ) Notice: Subject to any disclaimer, the term of this patent is extended or adjusted under 35 U.S.C. 154(b) by 9 days.

(21) Appl. No.: 10/184,748

(22) Filed: Jun. 28, 2002

(51) Int. Cl.[7] .............................................. G08B 21/00
(52) U.S. Cl. ..................... 340/945; 340/5.64; 340/5.65; 340/534; 340/539.11; 340/963; 348/14.01
(58) Field of Search .................. 340/948, 963, 340/534, 539.11, 5.64, 5.65; 244/118.5; 348/14.01, 14.02

(56) References Cited

U.S. PATENT DOCUMENTS

| 5,438,315 | A | * | 8/1995 | Nix | 340/539.11 |
|---|---|---|---|---|---|
| 5,798,458 | A | * | 8/1998 | Monroe | 73/587 |
| 6,246,320 | B1 | * | 6/2001 | Monroe | 340/506 |
| 6,366,311 | B1 | * | 4/2002 | Monroe | 348/148 |
| 6,449,472 | B1 | * | 9/2002 | Dixit et al. | 455/404.1 |
| 2002/0004695 | A1 | * | 1/2002 | Glenn et al. | 701/35 |
| 2002/0186135 | A1 | * | 12/2002 | Wagner | 340/573.1 |
| 2003/0058135 | A1 | * | 3/2003 | Kimmet | 340/945 |
| 2003/0062447 | A1 | * | 4/2003 | Cordina et al. | 244/118.5 |

* cited by examiner

Primary Examiner—Daniel J. Will
Assistant Examiner—Son Tang

(57) ABSTRACT

An aircraft emergency warning system having a wireless transmitter camouflaged as personal effects. The wireless transmitter is capable of transmitting an alarm signal. A cockpit alarm control system is capable of receiving the transmitted alarm signal. The cockpit alarm control system is capable of outputting an activation signal. An aircraft surveillance system is electrically connected to the cockpit alarm control system. The aircraft surveillance system is capable of responding to the activation signal.

1 Claim, 3 Drawing Sheets

AIRCRAFT EMERGENCY WARNING SYSTEM

BACKGROUND OF THE INVENTION

1. Field of the Invention

The present invention relates to an aircraft emergency warning system for use in connection with aircraft security systems. The aircraft emergency warning system has particular utility in connection with aircraft emergency warning system that covertly pages the flight crew with a warning from the aircraft cabin.

2. Description of the Prior Art

Aircraft emergency warning systems are desirable for protecting commercial aircraft from the unannounced onslaught of a hijacking or a terrorist action. In many instances the cabin of an aircraft is where hostile actions originate, the occupants of the cabin many times become aware of a hostile act before the flight crew does. In these instances the advanced warning of an action can mean the difference between thwarting an action or becoming a victim. A need was felt for providing the flight crew with a covert warning of from the aircraft cabin.

The use of aircraft security systems is known in the prior art. For example, U.S. Pat. No. 5,063,371 to Oyer et al discloses an aircraft security system that includes a central control unit, several remotely located cluster controllers and a plurality of intrusion sensors associated with and controlled by each cluster controller. A two-wire bus carries power from the central control unit for operating each of the cluster controllers and the sensors and carries data signals in both directions between the central control unit and the cluster controllers. The system includes an initial calibration mode wherein sensor type information and sensor parameters are sent from the central control unit to each cluster controller. The signal strength from each sensor is then measured and stored in the central control unit. During later operation, the sensor signal strengths are measured and compared with the initial values. If a trouble condition is detected, appropriate corrective action is taken. However, the Oyer et al '371 patent does not include emergency transmitters camouflaged as ordinary personal items such as a pin, broach, watch, earring, belt buckle or pen to send a warning to an cockpit alarm control system.

Similarly, U.S. Pat. No. 4,706,091 to Scott discloses a cockpit transmission assembly that discretely transmits voice conversations emanating from the cockpit of the aircraft automatically to a ground tracking station or a tracking aircraft in an emergency situation, such as a hijacking. The transmission system comprises an audio switching assembly which, when activated, transfers audio signals from a voice recorder assembly normally found on commercial aircraft to a radio transceiver of the aircraft for automatic transmission to ground tracking stations. Activation of the system can occur by a crew member carrying out his normal activities therefore not alerting hijackers when performing duties related to setting the dual transponder control to a preselected code setting and/or the frequency channel selector of the radio transceiver to a preselected frequency. However, the Scott '091 patent does not include emergency transmitters camouflaged as ordinary personal items such as a pin, broach, watch, earring, belt buckle or pen to send a warning to an cockpit alarm control system.

Lastly, U.S. Pat. No. Des. 337,067 to Patterson discloses a combined audible alarm and signaling transmitter that sends an alarm signal and announces an audible alarm when triggered. However, the Patterson '067 patent does not include emergency transmitters camouflaged as ordinary personal items such as a pin, broach, watch, earring, belt buckle or pen to send a warning to an cockpit alarm control system.

While the above-described devices fulfill their respective, particular objectives and requirements, the aforementioned patents do not describe an aircraft emergency warning system that allows aircraft emergency warning system that covertly pages the flight crew with a warning from the aircraft cabin. The Oyer et al '371, Scott '091 and Patterson '067 patents make no provision for including emergency transmitters camouflaged as ordinary personal items such as a pin, broach, watch earring, belt buckle or pen to send a warning to an cockpit alarm control system.

Therefore, a need exists for a new and improved aircraft emergency warning system which can be used for aircraft emergency warning system that covertly pages the flight crew with a warning from the aircraft cabin. In this regard, the present invention substantially fulfills this need. In this respect, the aircraft emergency warning system according to the present invention substantially departs from the conventional concepts and designs of the prior art, and in doing so provides an apparatus primarily developed for the purpose of aircraft emergency warning system that covertly pages the flight crew with a warning from the aircraft cabin.

SUMMARY OF THE INVENTION

In view of the foregoing disadvantages inherent in the known types of aircraft security systems now present in the prior art, the present invention provides an improved aircraft emergency warning system, and overcomes the above-mentioned disadvantages and drawbacks of the prior art. As such, the general purpose of the present invention, which will be described subsequently in greater detail, is to provide a new and improved aircraft emergency warning system and method which has all the advantages of the prior art mentioned heretofore and many novel features that result in an aircraft emergency warning system which is not anticipated, rendered obvious, suggested, or even implied by the prior art, either alone or in any combination thereof.

To attain this, the present invention essentially comprises a wireless transmitter 12 camouflaged as personal effects. The wireless transmitter 12 is capable of transmitting an alarm signal. A cockpit alarm control system is capable of receiving the transmitted alarm signal. The cockpit alarm control system is capable of outputting an activation signal. An aircraft surveillance system is electrically connected to the cockpit alarm control system. The aircraft surveillance system is capable of responding to the activation signal.

There has thus been outlined, rather broadly, the more important features of the invention in order that the detailed description thereof that follows may be better understood and in order that the present contribution to the art may be better appreciated.

The invention may also include a transmitter switch, a transmitter counter circuit, a microprocessor circuit, a receiver, a non-volatile memory, an audio alert, a video alert, an alarm location display, a surveillance controller, a video camera, a video display, a microphone and an audio output. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved aircraft emergency warning system that has all of the advantages of the prior art aircraft security systems and none of the disadvantages.

It is another object of the present invention to provide a new and improved aircraft emergency warning system that may be easily and efficiently manufactured and marketed.

An even further object of the present invention is to provide a new and improved aircraft emergency warning system that has a low cost of manufacture with regard to both materials and labor, and which accordingly is then susceptible of low prices of sale to the consuming public, thereby making such aircraft emergency warning system economically available to the buying public.

Still another object of the present invention is to provide a new aircraft emergency warning system that provides in the apparatuses and methods of the prior art some of the advantages thereof, while simultaneously overcoming some of the disadvantages normally associated therewith.

Even still another object of the present invention is to provide an aircraft emergency warning system for covertly paging the flight crew with a warning from the aircraft cabin.

Lastly, it is an object of the present invention is to provide an aircraft emergency warning system in which the warning transmitters are disguised as personal items such as a broach, a pen, a pin, a watch or a belt buckle.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
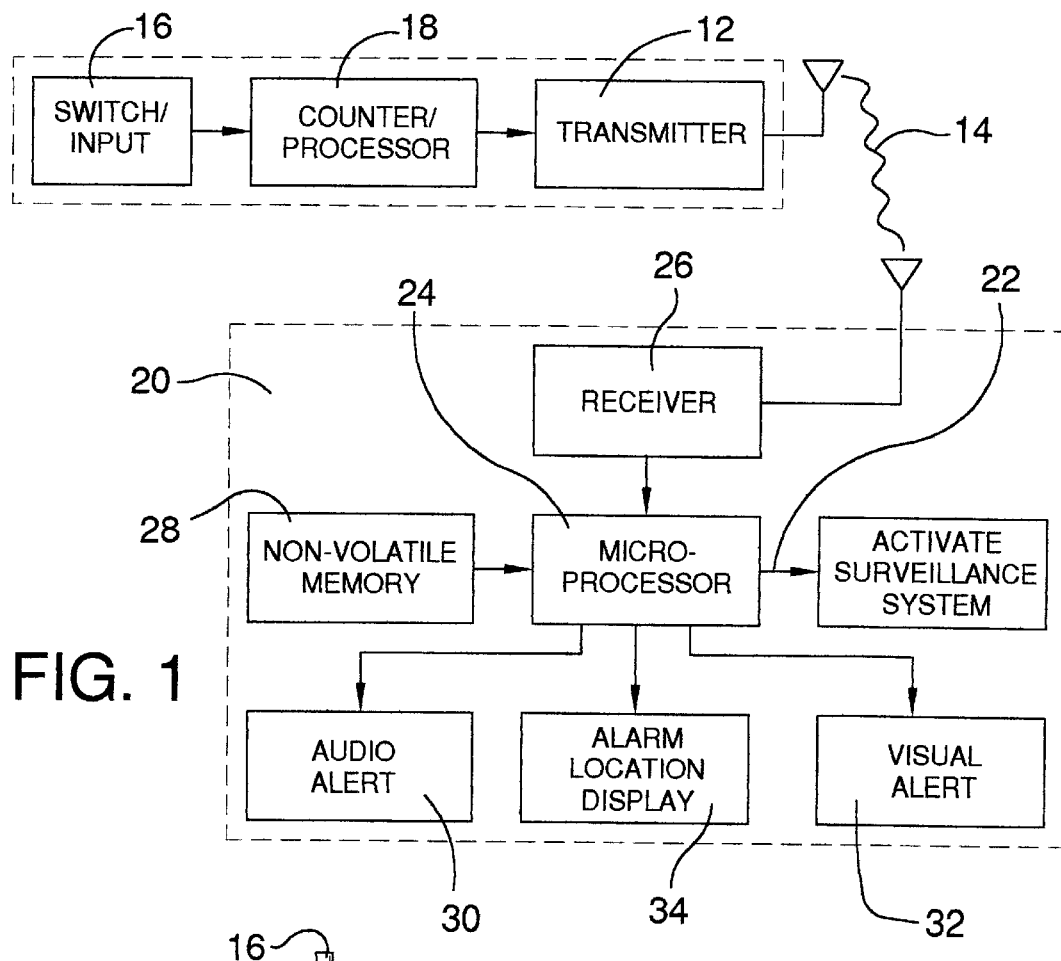
FIG. 1 is a block diagram view of the preferred embodiment of the aircraft emergency warning system constructed in accordance with the principles of the present invention.

Referring now to the drawings, and particularly to FIGS. 1–4, a preferred embodiment of the aircraft emergency warning system of the present invention is shown and generally designated by the reference numeral 10.

In FIG. 1, a new and improved aircraft emergency warning system 10 of the present invention for aircraft emergency warning system that covertly pages the flight crew with the warning from the aircraft cabin is illustrated and will be described. More particularly, the aircraft emergency warning system 10 has a wireless transmitter 12 camouflaged as personal effects, the wireless transmitter 12 is capable of transmitting an alarm signal 14. A transmitter switch 16 is electrically connected to the wireless transmitter 12. A transmitter counter circuit 18 is electrically connected to the transmitter switch 16. The transmitter counter circuit 18 is electrically connected to the wireless transmitter 12. The transmitter counter circuit 18 is capable of triggering the wireless transmitter 12 to transmit the alarm signal 14 only after the transmitter switch 16 has been activated the predetermined number of times for precluding accidental transmission of the alarm signal 14. A cockpit alarm control system 20 is capable of receiving the transmitted alarm signal 14. The cockpit alarm control system 20 is capable of outputting an activation signal 22. A microprocessor circuit 24 is electrically connected to cockpit alarm control system 20. A receiver 26 is electrically connected to the microprocessor circuit 24. A non-volatile memory 28 is electrically connected to the microprocessor circuit 24. An audio alert 30 is electrically connected to the microprocessor circuit 24. A visual alert 32 is electrically connected to the microprocessor circuit 24. An alarm location display 34 is electrically connected to the microprocessor circuit 24. The alarm location display 34 is capable of displaying the generalized location of the alarm signal 14 within the aircraft cabin.

Figure 2:
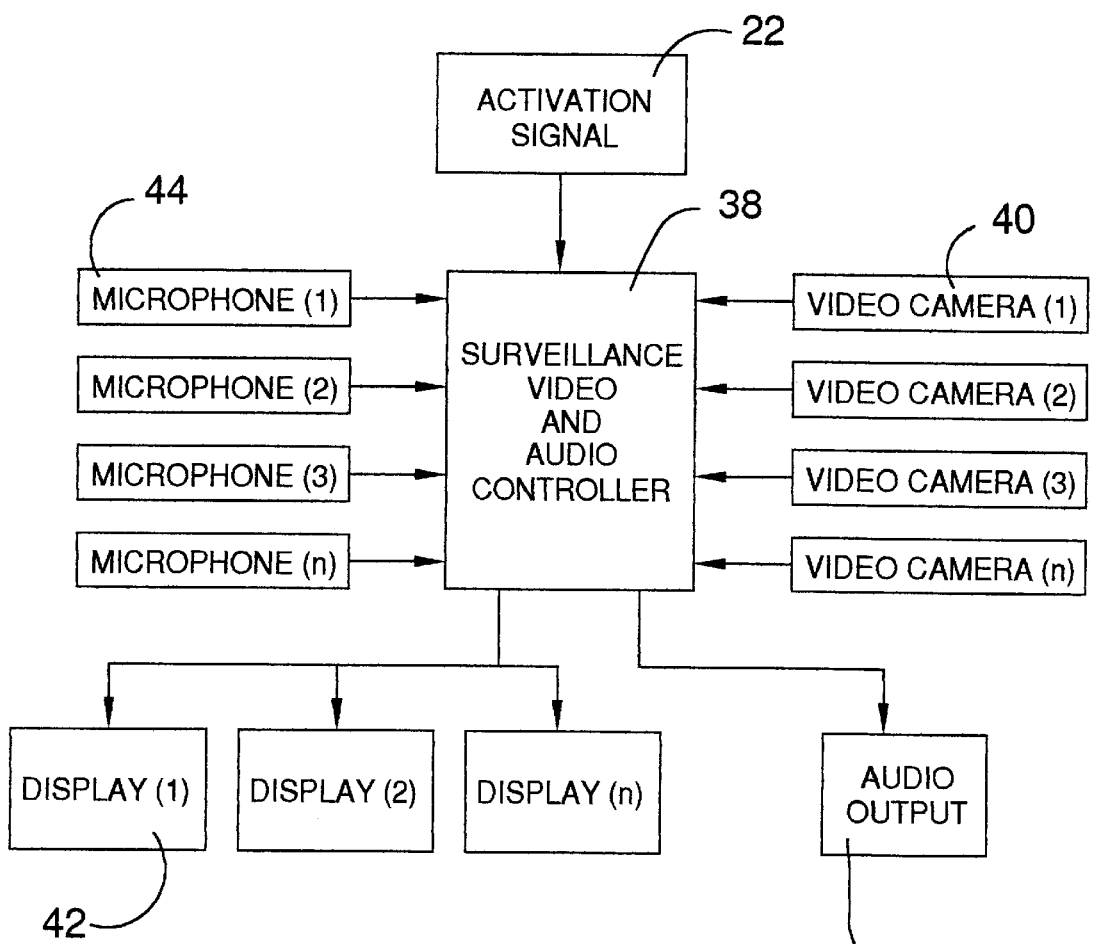
FIG. 2 is a block diagram view of the aircraft emergency warning system of the present invention.

In FIG. 2, the aircraft emergency warning system 10 is illustrated and will be described. An aircraft surveillance system 36 is electrically connected to the cockpit alarm control system 20. The aircraft surveillance system 36 is capable of responding to the activation signal 22. A surveillance controller 38 is electrically connected to the cockpit alarm control system 20. The surveillance controller is electrically connected to the aircraft surveillance system 36. A plurality of video cameras 40 are electrically connected to the surveillance controller, the video cameras 40 are connected to the aircraft cabin interior. A video display 42 is electrically connected to the surveillance controller. A plurality of microphones 44 are electrically connected to the surveillance controller. The microphones 44 are connected to the aircraft cabin interior. An audio output 46 is electrically connected to the surveillance controller.

Figure 3:
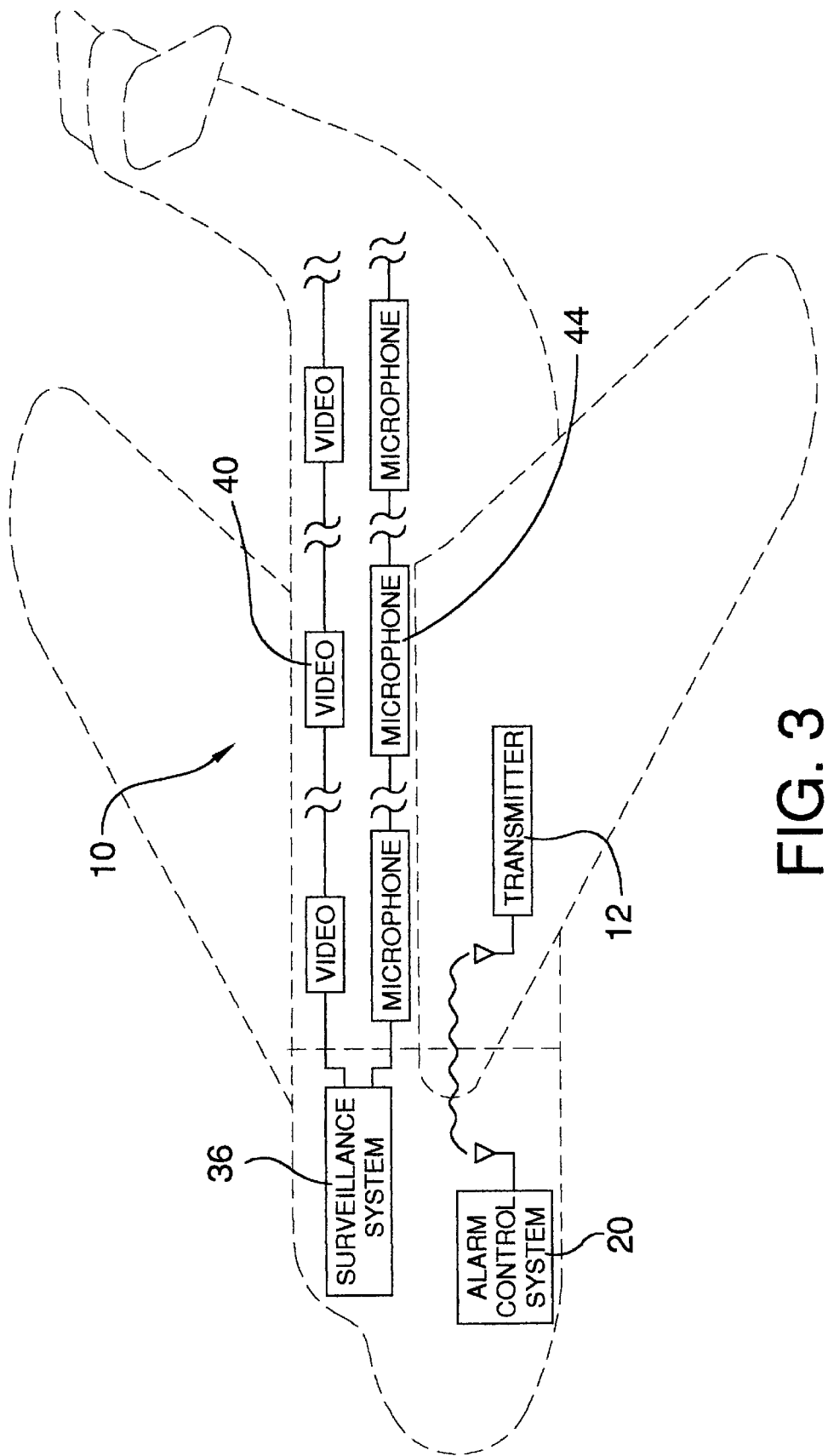
FIG. 3 is a block diagram view of the aircraft emergency warning system of the present invention.

In FIG. 3, the aircraft emergency warning system 10 is illustrated and will be described. The aircraft emergency warning system 10 has the wireless transmitter 12 camouflaged as personal effects, the wireless transmitter 12 is capable of transmitting the alarm signal 14. The cockpit alarm control system 20 is capable of receiving the transmitted alarm signal 14. The cockpit alarm control system 20 is capable of outputting the activation signal 22. The aircraft surveillance system 36 is electrically connected to the cockpit alarm control system 20. The aircraft surveillance system 36 is capable of responding to the activation signal 22. The aircraft surveillance system 36 is electrically connected to the video cameras 40 and the microphones 44. The video cameras 40 are connected to the aircraft cabin interior. The microphones 44 are connected to the aircraft cabin interior.

Figure 4:
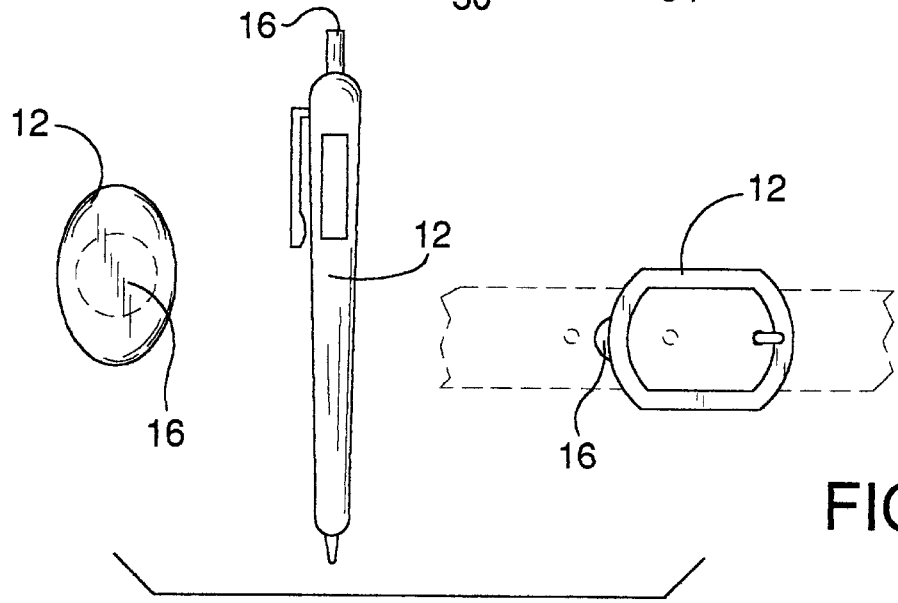
FIG. 4 is a front side view of the aircraft emergency warning system of the present invention.

In FIG. 4, the aircraft emergency warning system 10 is illustrated and will be described. The aircraft emergency warning system 10 has the wireless transmitter 12 camouflaged as personal effects. In the present example the camouflaged personal effects includes a broach, a pin, a pen, a belt buckle, a watch and a pager. The transmitter switch 16 is electrically connected to the wireless transmitter 12.

In use, it can now be understood that a member of the flight crew would press the transmitter switch 16 on his personal effect. The alarm signal 14 would be transmitted to the cockpit alarm control system 20 which would sound the audio alert 30 and light the visual alert 32 and show the location of the alarm in the aircraft on the aircraft location display 34. The activation signal would be sent from the cockpit alarm control system 20 to the aircraft surveillance system 36 which would activate the video cameras 40, the video displays 42, the microphones 44 and the audio output 46.

While a preferred embodiment of the aircraft emergency warning system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although aircraft emergency warning system that covertly pages the flight crew with a warning from the aircraft cabin have been described, it should be appreciated that the aircraft emergency warning system herein described is also suitable for covert warning in any crowd environment.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An aircraft emergency warning system comprising:
a wireless transmitter camouflaged as personal effects, said wireless transmitter capable of transmitting an alarm signal;
a transmitter switch electrically connected to said wireless transmitter;
a transmitter counter circuit electrically connected to said transmitter switch, said transmitter counter circuit electrically connected to said wireless transmitter, said transmitter counter circuit capable of triggering said wireless transmitter to transmit said alarm signal only after said transmitter switch has been activated a predetermined number of times for precluding accidental transmission of said alarm signal;
a cockpit alarm control system capable of receiving said transmitted alarm signal, said cockpit alarm control system capable of outputting an activation signal;
a microprocessor circuit electrically connected to cockpit alarm control system;
a receiver electrically connected to said microprocessor circuit;
a non-volatile memory electrically connected to said microprocessor circuit;
an audio alert electrically connected to said microprocessor circuit;
a visual alert electrically connected to said microprocessor circuit;
an alarm location display electrically connected to said microprocessor circuit, said alarm location display capable of displaying the generalized location of said alarm signal within the aircraft cabin;
an aircraft surveillance system electrically connected to said cockpit alarm control system, said aircraft surveillance system capable of responding to said activation signal;
a surveillance controller electrically connected to said cockpit alarm control system, said surveillance controller electrically connected to said aircraft surveillance system;
a plurality of video cameras electrically connected to said surveillance controller, said video cameras connected to said aircraft cabin interior;
a video display electrically connected to said surveillance controller;
a plurality of microphones electrically connected to said surveillance controller, said microphones connected to said aircraft cabin interior; and
an audio output electrically connected to said surveillance controller.

* * * * *